(12) United States Patent
Ma

(10) Patent No.: US 12,720,237 B2
(45) Date of Patent: Aug. 25, 2026

(54) DYNAMIC PIXEL-WISE MULTI-GAIN READOUT FOR HIGH DYNAMIC RANGE IMAGING

(71) Applicant: Gigajot Technology, Inc., Glendale, CA (US)

(72) Inventor: Jiaju Ma, Monrovia, CA (US)

(73) Assignee: Gigajot Technology, Inc., Glendale, CA (US)

( * ) Notice: Subject to any disclaimer, the term of this patent is extended or adjusted under 35 U.S.C. 154(b) by 38 days.

(21) Appl. No.: 19/012,742

(22) Filed: Jan. 7, 2025

(65) Prior Publication Data

US 2025/0150736 A1 May 8, 2025

Related U.S. Application Data

(63) Continuation of application No. 18/045,639, filed on Oct. 11, 2022, now Pat. No. 12,225,315.
(Continued)

(51) Int. Cl.
*H04N 25/78* (2023.01)
*H04N 25/11* (2023.01)
*H04N 25/51* (2023.01)

(52) U.S. Cl.
CPC ............. *H04N 25/78* (2023.01); *H04N 25/11* (2023.01); *H04N 25/51* (2023.01)

(58) Field of Classification Search
CPC ........ H04N 25/78; H04N 25/11; H04N 25/51; H04N 23/76; H04N 25/59; H04N 25/778; H04N 23/72; H04N 25/585; H04N 25/77
See application file for complete search history.

(56) References Cited

U.S. PATENT DOCUMENTS 9,967,472 B2 * 5/2018 Koshkin ................ H04N 25/78
10,257,448 B1 4/2019 Tower et al.
(Continued)

FOREIGN PATENT DOCUMENTS

CN 108881747 10/2020
JP 2009503896 A 1/2009
(Continued)

OTHER PUBLICATIONS

Office Action from Japanese Patent Application No. 2024-522084, dated Mar. 30, 2025, pp. 1-2.
(Continued)

*Primary Examiner* — Nhan T Tran
(74) *Attorney, Agent, or Firm* — Robert C. Kowert; Kowert, Hood, Munyon, Rankin & Goetzel, P.C.

(57) ABSTRACT

Systems and methods are disclosed to enable fast readout from an image sensor to support pixel-wise conversion gain selection for high dynamic range imaging. In embodiments, an image sensor integrated circuit performs the pixel-wise gain selection with its readout circuitry, so that the image sensor outputs pixels with only the selected gain option. In this manner, the image sensor is able to achieve faster frame rates and lower power consumption. Depending on the embodiment, the conversion gain may be selected by the readout logic, an image signal processor, or an auto-exposure engine. The gain selection may be made based on a previous image captured by the camera or other pixels in the same image. The image signal processor may interpolate a high-gain and a low-gain portion of the image to obtain full resolution images in the two gain options, and merge the two to obtain the final image.

20 Claims, 12 Drawing Sheets

Related U.S. Application Data

(60) Provisional application No. 63/254,219, filed on Oct. 11, 2021.

(56) References Cited

U.S. PATENT DOCUMENTS

| | | | | |
|---|---|---|---|---|
| 10,645,315 | B2 | 5/2020 | Shim et al. | |
| 2009/0225189 | A1 | 9/2009 | Morin | |
| 2012/0188427 | A1 | 7/2012 | Solhusvik | |
| 2012/0256077 | A1* | 10/2012 | Yen | H04N 25/59 250/208.1 |
| 2013/0048831 | A1 | 2/2013 | Bikumandla | |
| 2015/0163430 | A1* | 6/2015 | Kanemitsu | H04N 25/585 348/308 |
| 2018/0191974 | A1* | 7/2018 | Shim | H04N 25/44 |
| 2023/0112586 | A1 | 4/2023 | Ma | |

FOREIGN PATENT DOCUMENTS

| | | | |
|---|---|---|---|
| WO | 201512121 | A1 | 1/2015 |
| WO | 2016197010 | | 12/2016 |

OTHER PUBLICATIONS

International Search Report and Written Opinion from PCT Application No. PCT/US2022/046299, dated Dec. 15, 2022 pp. 1-14.

* cited by examiner

Figure 2:
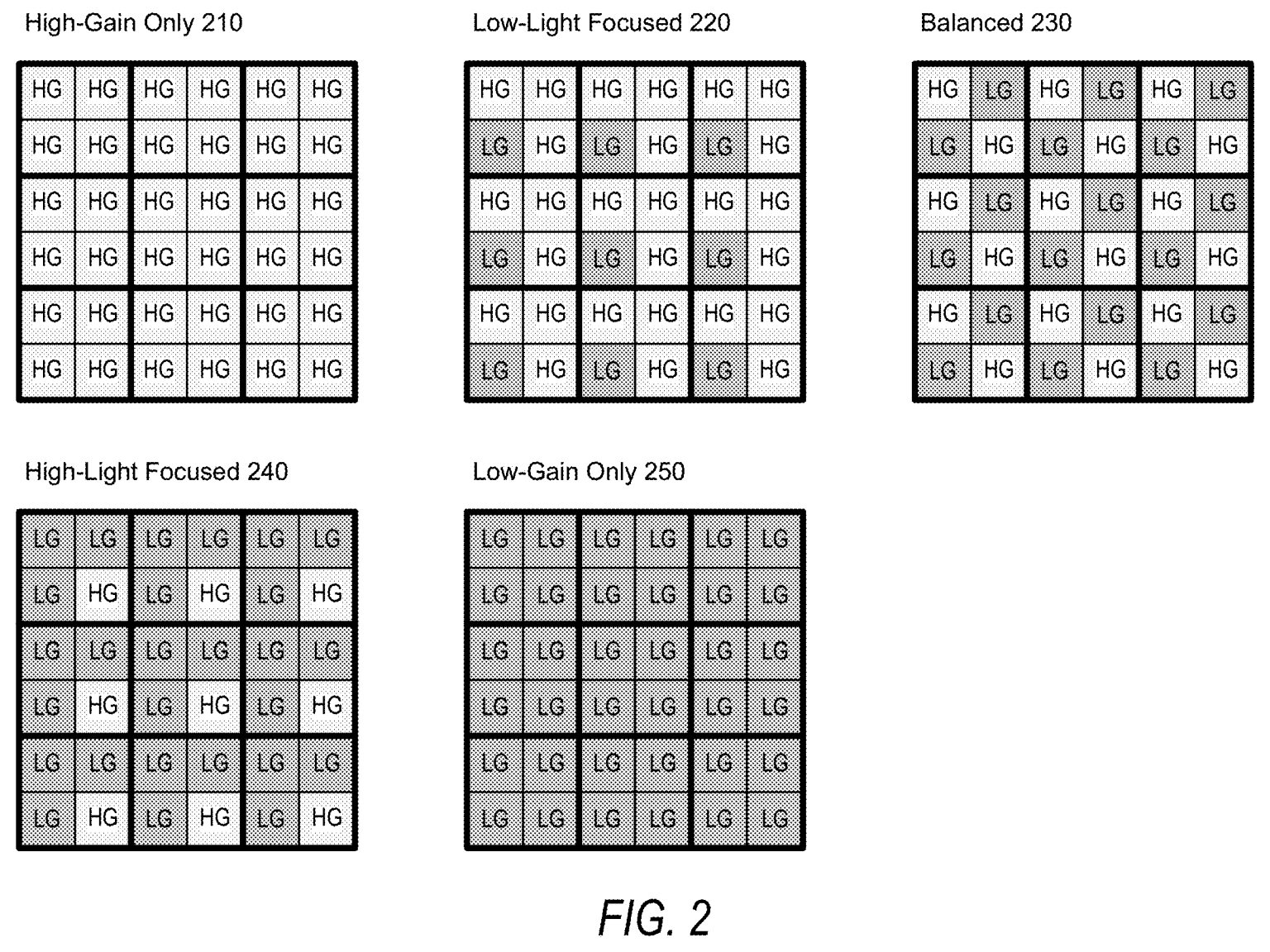

High-Gain Only 210

HG HG HG HG HG HG
HG HG HG HG HG HG
HG HG HG HG HG HG
HG HG HG HG HG HG
HG HG HG HG HG HG
HG HG HG HG HG HG

Low-Light Focused 220

HG HG HG HG HG HG
LG HG LG HG LG HG
HG HG HG HG HG HG
LG HG LG HG LG HG
HG HG HG HG HG HG
LG HG LG HG LG HG

Balanced 230

HG LG HG LG HG LG
LG HG LG HG LG HG
HG LG HG LG HG LG
LG HG LG HG LG HG
HG LG HG LG HG LG
LG HG LG HG LG HG

High-Light Focused 240

LG LG LG LG LG LG
LG HG LG HG LG HG
LG LG LG LG LG LG
LG HG LG HG LG HG
LG LG LG LG LG LG
LG HG LG HG LG HG

Low-Gain Only 250

CFA Placement for 3x3 Pixel Units
920

CFA Placement for 2x2 Pixel Units
910

CFA Placement for 2x2 Pixel Units 1010

DYNAMIC PIXEL-WISE MULTI-GAIN READOUT FOR HIGH DYNAMIC RANGE IMAGING

CROSS-REFERENCE TO RELATED APPLICATIONS

This application is a continuation of U.S. patent application Ser. No. 18/045,639, filed Oct. 11, 2022, which claims priority to and incorporates by reference U.S. Provisional Application No. 63/254,219, entitled "Dynamic Pixel-Wise Multi-Gain Readout for High Dynamic Range Imaging," filed Oct. 11, 2021, which is hereby incorporated by reference herein in its entirety.

TECHNICAL FIELD

This disclosure herein relates to integrated-circuit image sensors and camera devices employing such image sensors.

BACKGROUND

CMOS image sensors with dual-conversion-gain (DCG) pixels read out the photo-electron signal from one exposure twice with high conversion gain (HCG) and low conversion gain (LCG) sequentially. The HCG signal provides lower readout noise but lower full-well capacity because of the limitation from the voltage swing of the floating diffusion. The LCG signal provides larger full-well capacity due to the lowered conversion gain but also higher readout noise. Each pixel produces these two signals for each frame, and a pixel-wise survey is performed during the image reconstruction based on the signal level to choose one signal for the final high dynamic range image. However, because DCG image sensors are outputting two readings per pixel (HCG and LCG), they typically require a higher data throughput rate per image frame than single conversion gain sensors. Conversely, DCG image sensors will have lower frame rate limits due to the larger amount of readout data for each image frame. DCG image sensors also have higher power consumption due to the larger amount of readout data.

BRIEF DESCRIPTION OF THE DRAWINGS

FIG. 2 illustrates a number of pixel gain configuration patterns that can be used by an image sensor with a 2×2 pixel unit architecture to perform pixel-wise conversion gain selection, according to some embodiments.

DETAILED DESCRIPTION

To address current challenges in image sensors that support high dynamic range imaging in the state of the art, various embodiments of an image sensor integrated circuit are disclosed to enable pixel-wise conversion gain selection within the image sensor to enable fast readout of pixel data. Instead of the image sensor outputting every pixel with each gain (e.g. twice for HCG and LCG), a pixel-wise gain selection is performed within the image sensor's readout circuitry so that each pixel value is output for just one gain option. Depending on the embodiment, the gain option can be a combination of the in-pixel conversion gain selection and the analog amplifier gain. In this manner, the image sensor is able to achieve faster output rates with lower power consumption.

In some embodiments, the conversion gain for individual pixels may be selected based on one or more selection signal(s), which may be generated by the readout logic of the image sensor, a downstream image signal processor, or an auto-exposure engine of the camera. The gain selection may be made based on a previous image captured by the camera, other pixel(s) in the same image, or a combination of the two. In some embodiments, the image signal processor may interpolate a high-gain and a low-gain portion of the image produced by the image sensor to obtain full resolution images in the two gain options, and merge the two full resolution images to obtain the final image.

Figure 1:
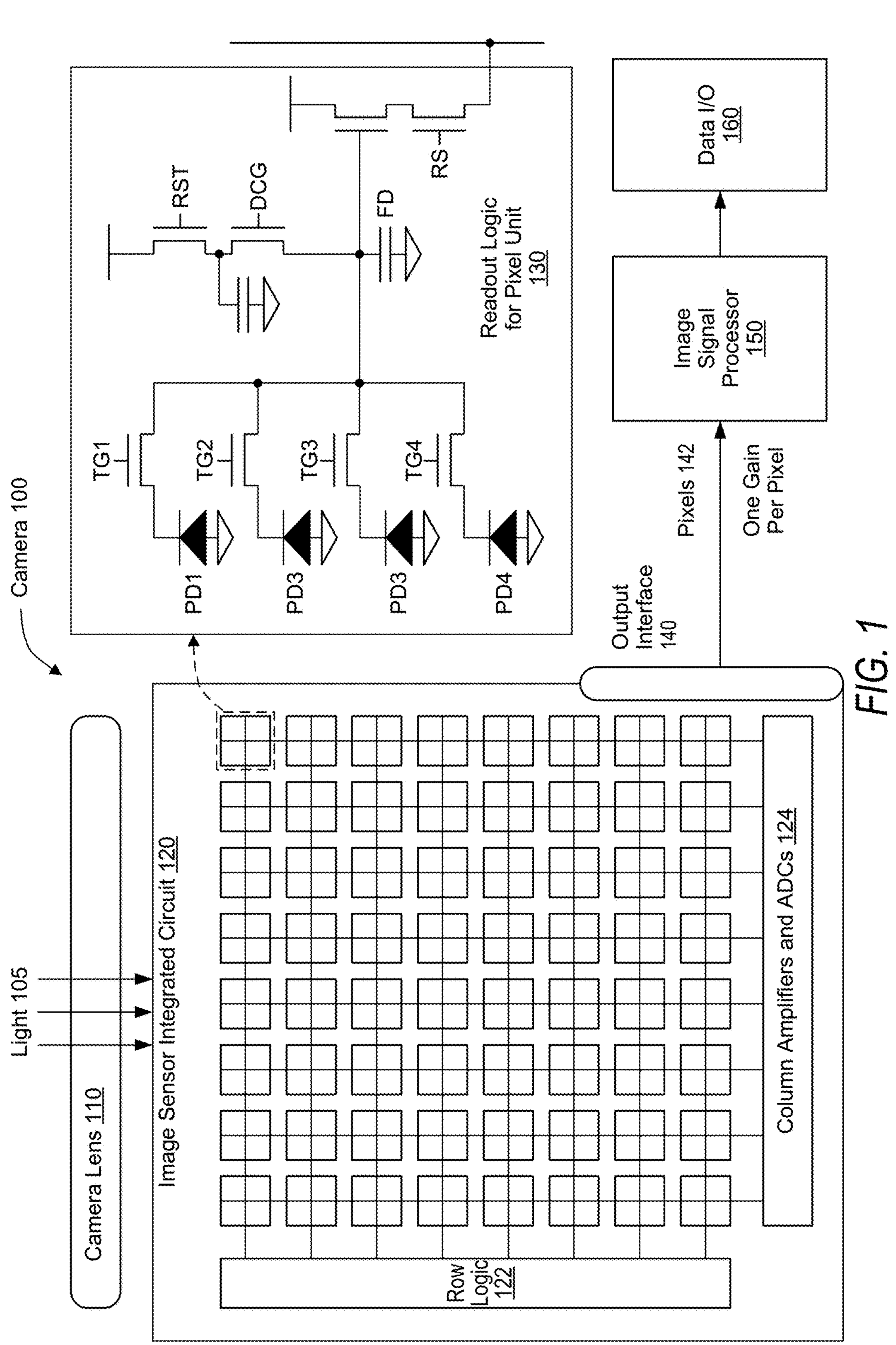
FIG. 1 illustrates an image sensor employing pixel units with shared readout logic to perform pixel-wise conversion gain selection, according to some embodiments.

FIG. 1 illustrates a camera with an image sensor that implements readout logic to perform pixel-wise conversion gain selection, according to some embodiments.

As shown, the figure depicts a camera 100 that implements an image sensor integrated circuit 120. The image sensor receives light 105 through a camera lens 105 of the camera. The light 105 may cause photodetection elements such photodiodes to emit electrical signals, which are read via the readout logic of the integrated circuit 120. The signal generated by an individual photodiode will correspond to a single pixel of an image frame. In some embodiments, the image sensor integrated circuit 120 may implement a pixel group architecture that groups a cluster of adjacent photodiodes in a pixel unit or kernel (a 2×2 pixel unit in this case) that shares common readout logic 130, as shown.

In some embodiments, the readout logic (e.g. readout logic 130) of the image sensor 120 may be used to implement pixel-wise gain selection, to select a single conversion gain for each individual pixel output by the image sensor. As shown in this example, the readout logic 130 allows for a gain selection signal DCG, which specifies whether a signal read from a photodiode (PD1 to PD4) over a transfer gate (TG1 to TG4) is read with high conversion gain (HCG) or low conversion gain (LCG). In some embodiments, the readout circuit may enable pixels to be read with more than two types of conversions gains.

As shown, the integrated circuit 120 may implement row logic 122 to control the timing of the readout. The integrated circuit 120 may also implement column amplifiers and analog-to-digital converters (ADCs) 124. The amplifiers are used to amplify the signals produced by the photodiodes. In some embodiments, the conversion gains of individual pixels are produced in part by the column amplifiers. The analog-to-digital converters are used to convert analog electrical signals into discrete digital signals that can be consumed by downstream components of the camera, such as the image signal processor (ISP) 150. The resulting signals for all pixels 142 are outputted sequentially through the output interface 140 of the image sensor integrated circuit 120, to be consumed by downstream components such as the image signal processor 150 and data I/O components 160.

Unlike current DCG image sensors, the disclosed image sensor integrated circuit 120 will only output the pixel data 142 for one gain (the gain used by the readout logic 130). By performing pixel-wise conversion gain selection within the image sensor and outputting the pixel with only one gain, the throughput rate of the output interface 140 can be dramatically reduced, along with the power consumption of the image sensor 120.

In some embodiments, the selection signal 134 may specify not just the gain for a single pixel, but a pixel gain configuration pattern for a group of pixels (e.g. the pixels in a pixel unit). For example, in a 2×2 shared readout pixel architecture as shown in FIG. 1, with each photodiode occupying a respective quadrant of the photodetection area, the gain selection in each 2×2 pixel unit can be programed to select from five different configuration patterns shown in FIG. 2. As shown, each pixel gain configuration pattern 210, 220, 230, 240, and 250 in this example uses a different number of HCG and LCG pixels in the pixel unit. Similar configuration patterns may be devised for a 3×3, 4×4, or other shared readout architectures.

Figure 3:
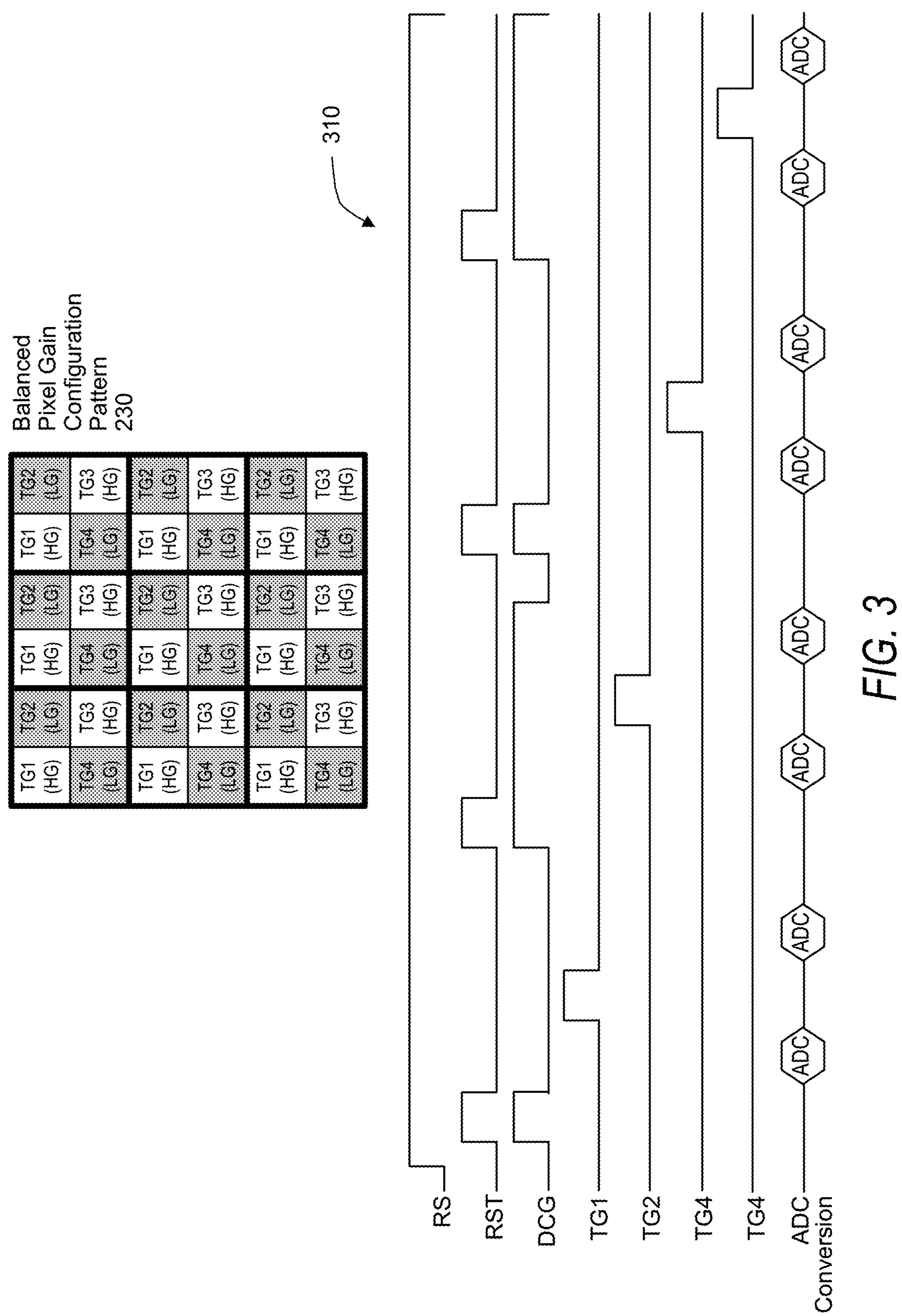
FIG. 3 illustrates a pixel gain control timing diagram for a type of pixel gain configuration pattern used by an image sensor that performs pixel-wise conversion gain selection, according to some embodiments.

FIG. 3 shows a pixel gain control timing diagram 310 for the "balanced" pixel-gain configuration pattern 230 of FIG. 2 and the 2×2 shared pixel readout architecture shown in FIG. 1. As shown, for the balanced configuration pattern, the gain selection (DCG) signal is only asserted for pixels 2 and 4 in the pixel unit.

A pixel gain configuration pattern may be selected based on the lighting condition observed by the camera. For example, based on the illumination level of the scene, the image sensor can switch between these configuration patterns for each frame to optimize the image quality in terms of the effective resolution, dynamic range, and readout noise. A higher high-gain (HG) pixel density provides better readout noise and image resolution for the low-light scene. On the other hand, a higher low-gain (LG) pixel density provides better readout noise and image resolution for the high-light scene. Equal density for HG and LG provides balanced performance for the high dynamic range scene.

Figure 4:
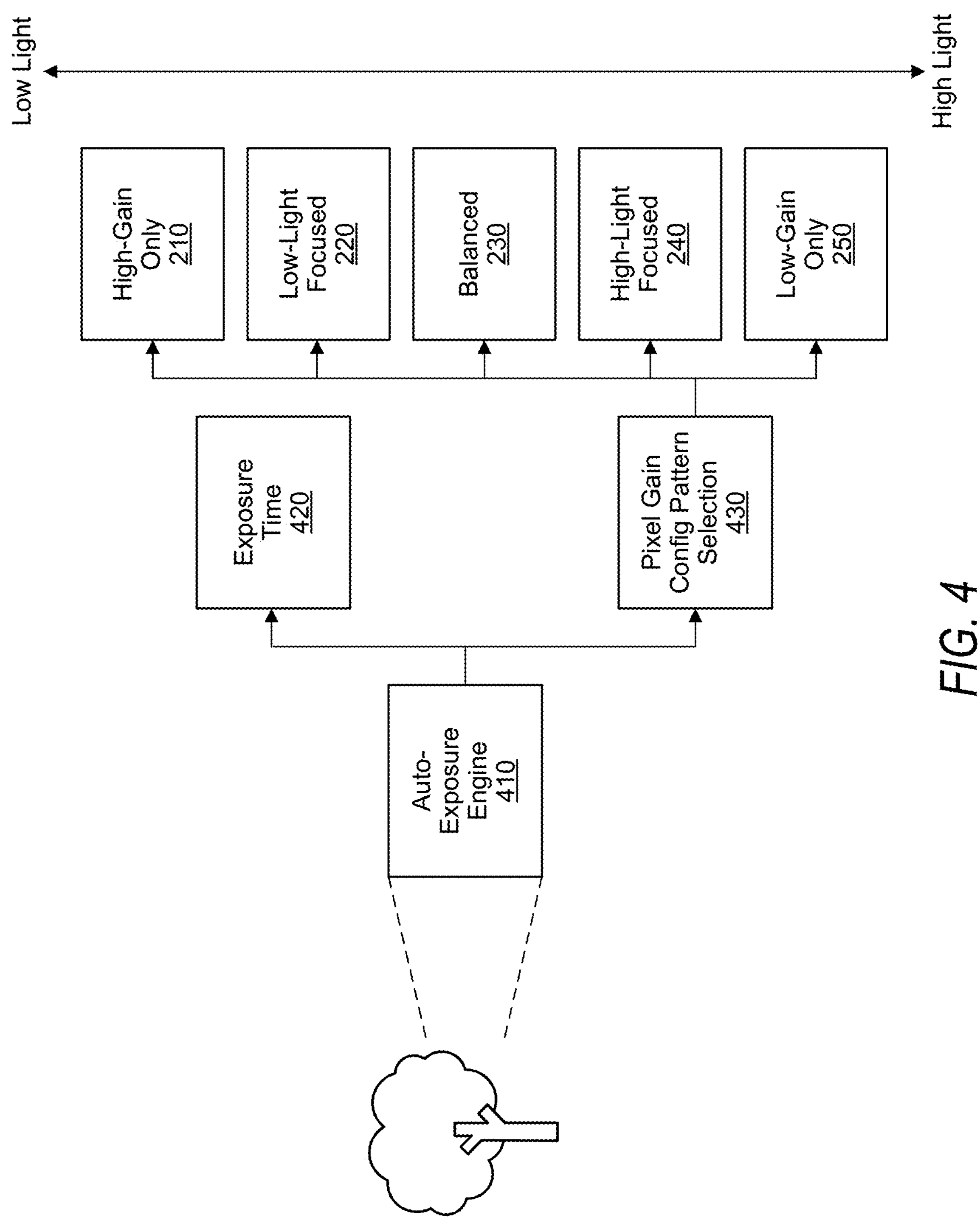
FIG. 4 illustrates use of an auto-exposure engine to select pixel gain configuration patterns for an image sensor, according to some embodiments.

FIG. 4 shows an embodiment where an auto-exposure engine 410 of the camera is used to select from the pixel gain configuration patterns 210-250. As shown, the auto-exposure engine 410 is used to control the exposure time 420 of the camera based on the observed lighting conditions. In some embodiments, the auto-exposure engine 410 may also be used to perform the selection of pixel gain configuration patterns. The selection decision may be conveyed to the image sensor 120 as one or more selection signal(s) 134 to control what gain patterns are to be applied to the pixel units. This selection can be changed dynamically for each image frame.

Depending on the embodiment, the selection signal(s) 134 may select (i) a respective gain for each pixel, (ii) a single pixel gain configuration pattern that is applied to all N×N region of pixels (e.g. same pattern for all pixel units), or (iii) a respective pixel gain configuration pattern for each region of pixels (e.g. different patterns for different pixel units). In some embodiments, a pixel region or pixel unit may not be in the shape of a square, but some other shape such as a rectangle.

In some embodiments, the pixel-wise gain selection decision may be made by the image sensor integrated circuit 120, based on analysis of one or more previous image frames captured by the camera (e.g. successive video frames). The ISP may analyze the previous image to assess the overall lighting condition of the previous image(s), and provide feedback to the image sensor 120 in the form of selection signal(s) 134. The selection signals may, for example, select a pixel gain configuration pattern (shown in FIG. 2) to use for all pixel units in the next image, or different patterns for individual ones of the pixel units. This feedback may be provided continuously so that the image sensor is able to dynamically change its pixel-wise gain configuration on the fly to optimize for changing lighting conditions.

Figure 5:
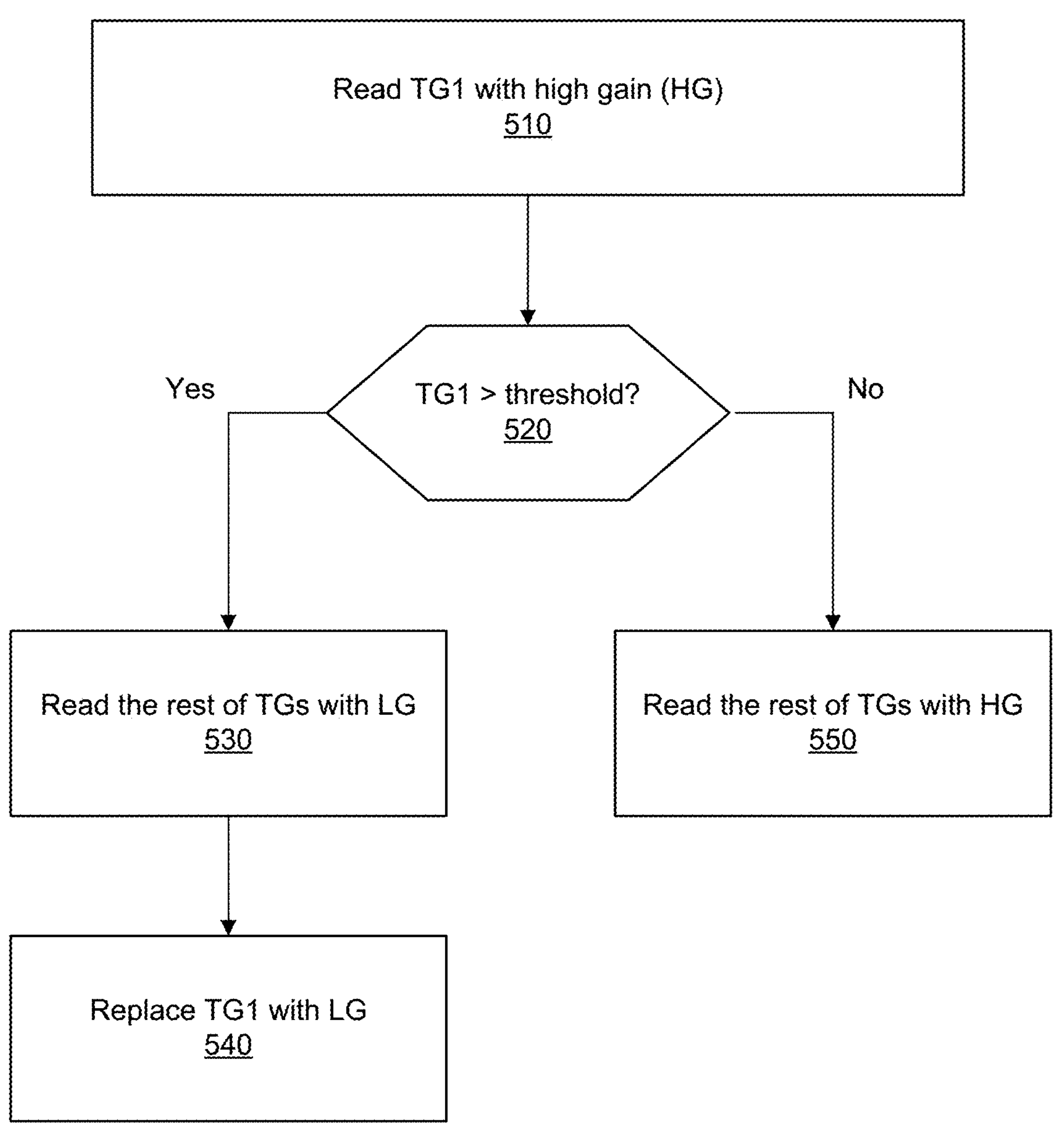
FIG. 5 illustrates a process of using a first pixel in a pixel unit or local region to determine the conversion for other pixels in the pixel unit or local region, according to some embodiments.

In other embodiments, the pixel-wise gain selection decision may be made within the image sensor integrated circuit 120 itself, based on the signal strength of other pixels in the same image frame. An example of such a selection decision process is shown in FIG. 5.

The selection decision in this example is based on a single initial pixel of the pixel group or local region, which is initially read with HG and received via transfer gate TG1, at operation 510. At operation 520, a determination is made whether the signal level of the first pixel is greater than a threshold (e.g. a saturation limit for the pixel). Operation 520 may be performed using a comparator implemented by the readout logic. If the value of the first pixel exceeds the threshold, the process proceeds to operation 530, where the rest of the pixels in the pixel unit or local region are read with LG. Then, at operation 540, the reading of the first pixel is replaced or reread with LG. However, if the value of the first pixel does not exceed the threshold, the value is retained for output, and the rest of the pixels in the pixel group or local region are read with HG. Accordingly, this method implements a form a local control to select the conversion gain for pixels in the entire pixel unit or local region.

Depending on the embodiment, variations on the disclosed method may also be used. For example, instead of sampling just a single initial pixel, the method may sample multiple pixels in the pixel unit or local region. The selection decision may be made based on the percentage of initial pixels that exceed the threshold, or whether an average of the initial pixels exceeds the threshold. In some embodiments, the percentage or average may be used to select a pixel gain configuration pattern for the pixel unit or the local region, as shown in FIG. 2.

In some embodiments, an image sensor manufactured in a stacked fabrication process can implement a regional pixel readout gain configuration. The pixel gain configuration pattern can be configured locally and individually for each small group of pixels (e.g. 4×4 pixels in a local region, as shown in FIG. 6).

Figure 6:
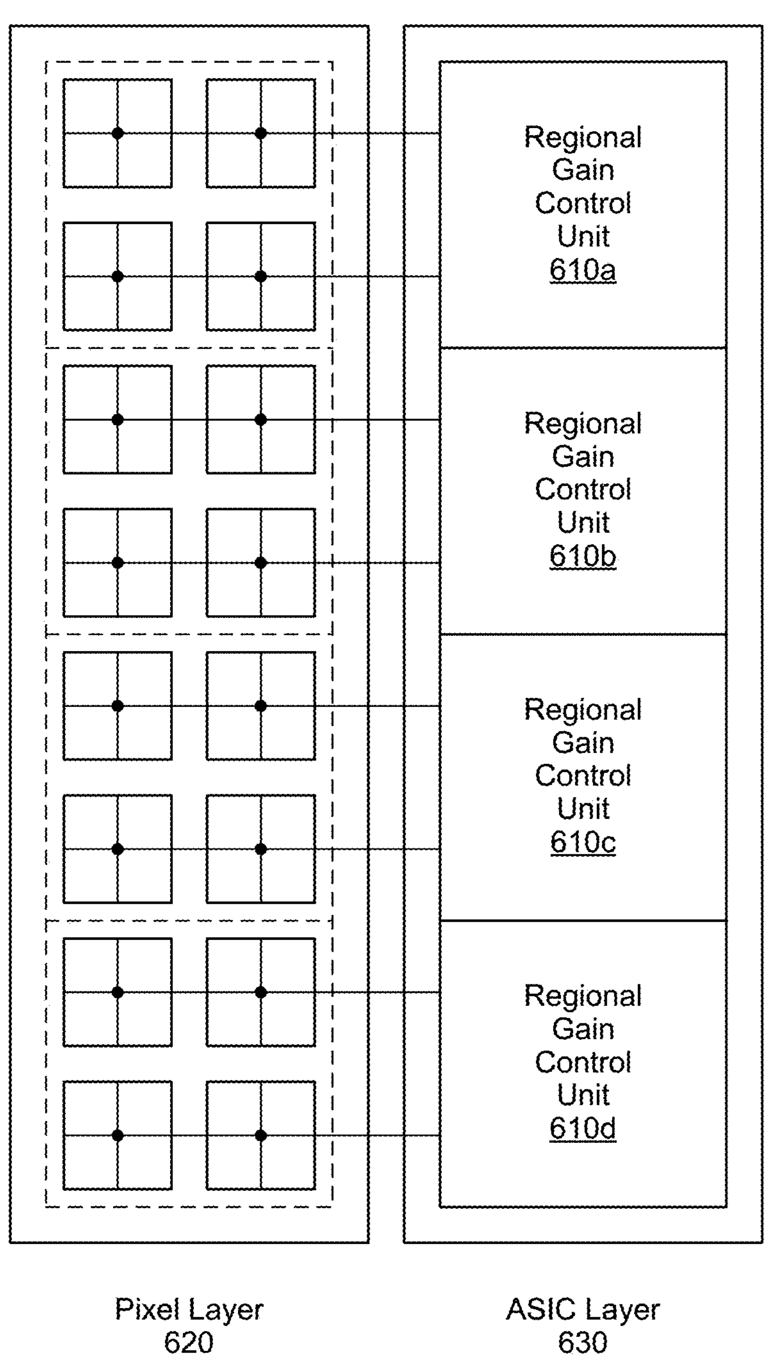
FIG. 6 illustrates an image sensor integration circuit employing regional pixel gain control units to control pixel gain in regions of pixels, according to some embodiments.

FIG. 6 shows an example implementation of regional pixel gain control, where every 4×4 pixel region on pixel layer 620 is connected to a dedicated regional gain control logic block 610*a-d* on the ASIC layer 630. Each regional control unit asserts the gain selection signal for its local region based on the signal levels of pixels in the local region. In some embodiments, the pixel levels used to make the gain selection decision may be from one or more previous frames observed by the camera. In other embodiments, the pixel levels may be from the current image.

Depending on the embodiment, the pixel-wise gain selected for the pixel unit or pixel local region can be (i) different for each pixel based on the calculated optimal conditions for each pixel, (ii) same for the N×N pixel unit or local region based on the optimal condition for the entire unit or region, or (iii) a pre-defined density-based pixel gain configuration pattern (e.g. a certain number of HG pixels and a certain number of LG pixels) such as shown in FIG. 2. In some embodiments, the same gain map can be used in the image reconstruction process on the same chip.

In some embodiments, the regional pixel gain control may be performed entirely within the image sensor integrated circuit 120 (e.g. as part of the readout logic for the image sensor). Individual ones of the regional gain control units 610*a-d* will make gain selection decisions for its own region, and does not share information with other regional gain control units. In some embodiments, the gain selection decision may be made using an comparator, so that if the pixel values of certain pixels are above a threshold, LG (or a low-gain focused configuration pattern) is used for all pixels in the region. In some embodiments, the ASIC layer 630 may be disposed below the pixel layer 620, in a manner so that the regional gain control units 610*a-d* are located directly below their respective regions. In some embodiments, registers may be used below the pixel region to store the gain selection decision determined by the regional gain control units.

Figure 7:
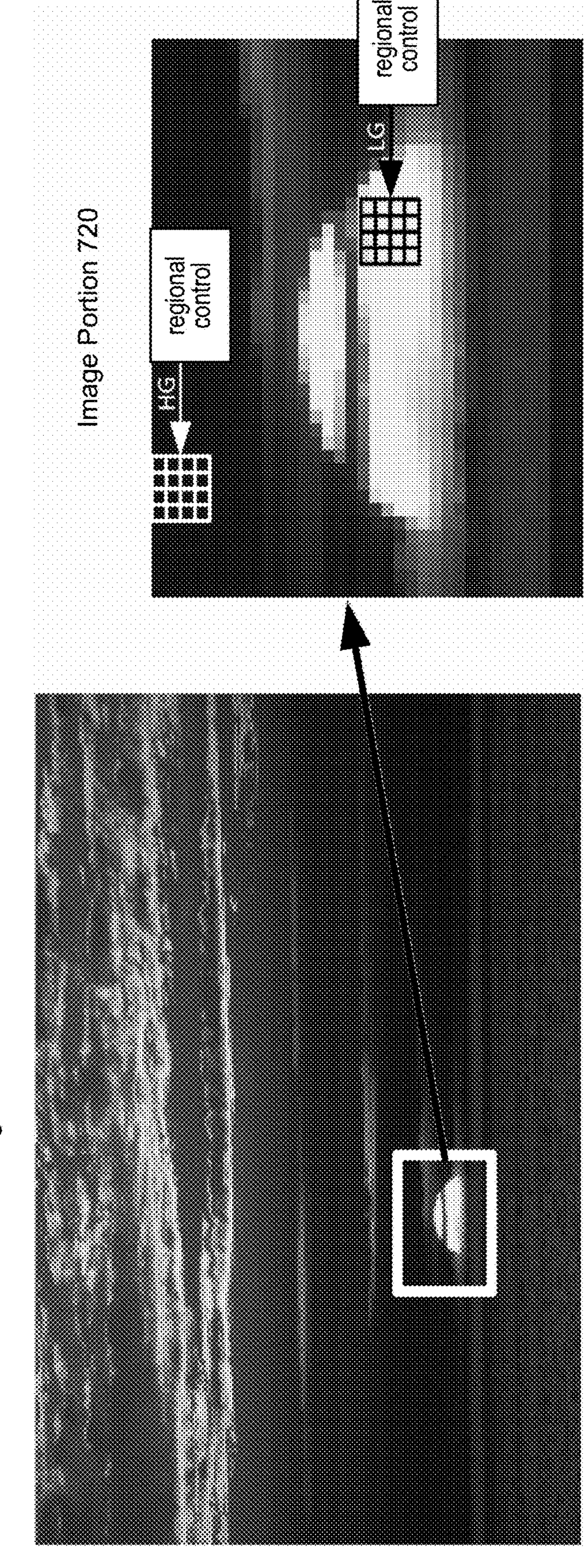
FIG. 7 illustrates an example of regional pixel gain control within an image performed by an image sensor integration circuit, according to some embodiments.

FIG. 7 illustrates an example of regional pixel gain control within an image performed by an image sensor integration circuit, according to some embodiments.

As shown, the right hand side of the figure shows a zoomed in portion 720 of the image 710 on the left hand side. In this example, regional pixel gain control is implemented for each 4×4 pixel region, for example, using the regional gain control units 610 of FIG. 6. As shown, the top region includes pixels with low light, so high-gain is selected for those pixels. The bottom region in the sun includes pixels with high light, so low-gain is selected for the pixels in that region.

Figure 8:
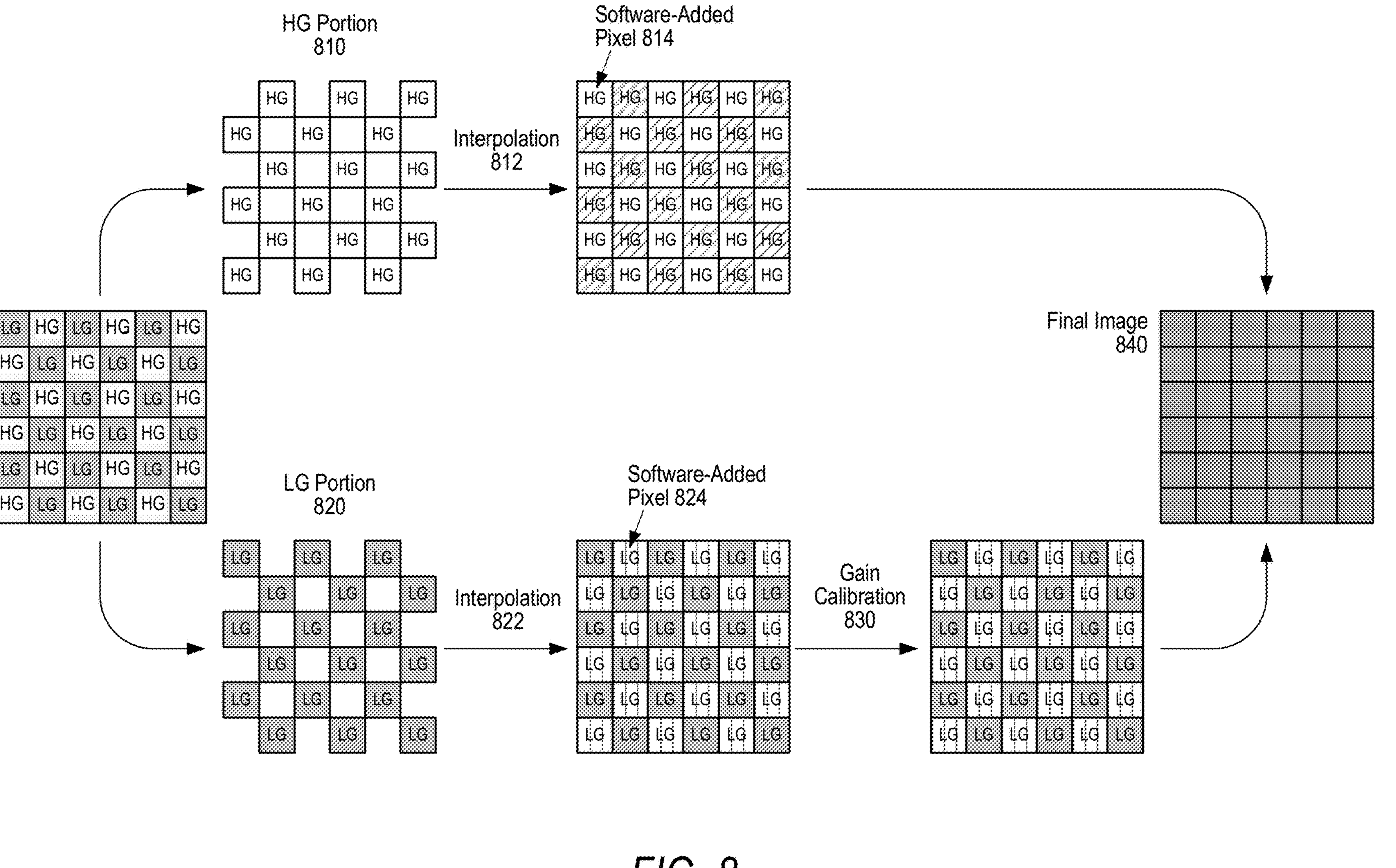
FIG. 8 illustrates an image reconstruction process performed by an image signal processor to reconstruct an image based on pixels output by the image sensor, according to some embodiments.

FIG. 8 illustrates an image reconstruction process performed by an image signal processor to reconstruct an image based on pixels output by the image sensor, according to some embodiments. In this example, the balanced gain configuration pattern 230 is received from the image sensor.

As shown in this example, since only one gain is used per pixel, some loss of pixel resolution is expected from the raw data. The raw sensor output is first separated into a HG portion 810 and a LG portion 820, both with half-resolution.

As shown, interpolation or other software operations 812 and 822 are then used to recover the resolution for each frame. The interpolation or other software operations can be performed using methods such as bi-linear, nearest neighbor, and bi-cubic, or it can be neural network-based algorithms. For a color sensor with a color filter array, the interpolation can be applied to the pixels within each color plane before the color planes are merged for demosaicing. As a result of the interpolation 812 and 822, software-added pixels 814 and 824 are estimated and add to the portions 810 and 820 respectively, to produce full resolution versions of the image in the two gain options.

As shown, a gain calibration operation 830 may be performed on the LG portion of the image at this point. The gain calibration is applied to the LG frame to accommodate the gain differences between the two gain options.

Finally, the recovered HG and LG portions are merged to create the final image 840, which is an image with high dynamic range. In some embodiments, the merging method may (1) check the values of HG frame for each pixel, (2) use the HG data if the pixel value is lower than a register-defined threshold, use the HG data, or (3) use the LG data if the pixel value is higher than the threshold. In other embodiments, the final image 840 may be constructed based on a weighted combination of corresponding pixels in the HG frame and the LG frame, for example, to smooth out transition regions in the image.

Figure 9:
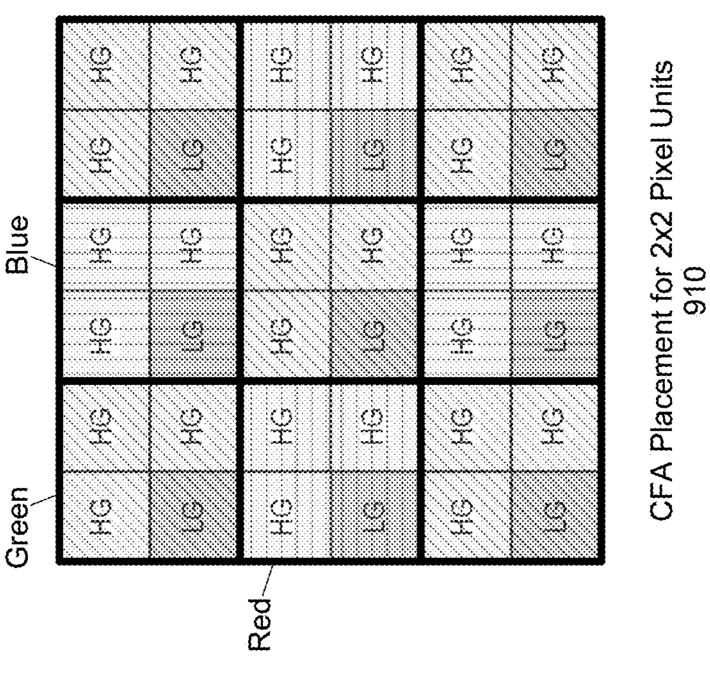
FIG. 9 illustrates example color filter array (CFA) placements for color image sensors that implement pixel-wise gain selection, according to some embodiments.

FIG. 9 illustrates example color filter array (CFA) placements for color image sensors that implement pixel-wise gain selection, according to some embodiments.

As shown, the figure depicts a CFA placement 910 for a 2×2 pixel unit architecture and a CFA placement 920 for a 3×3 pixel unit architecture. In some embodiments, it is preferred that pixels that are associated with the same conversion gain configuration pattern (e.g. a pixel unit or a local region) are filtered with the same color. This technique allows pixels in the same pixel unit or local region to be treated the same by downstream image processing components (e.g. to perform image recovery), which simplifies downstream processing processes. However, in some embodiments, different colors may be used to filter pixels in the same pixel unit or local region.

Figure 10:
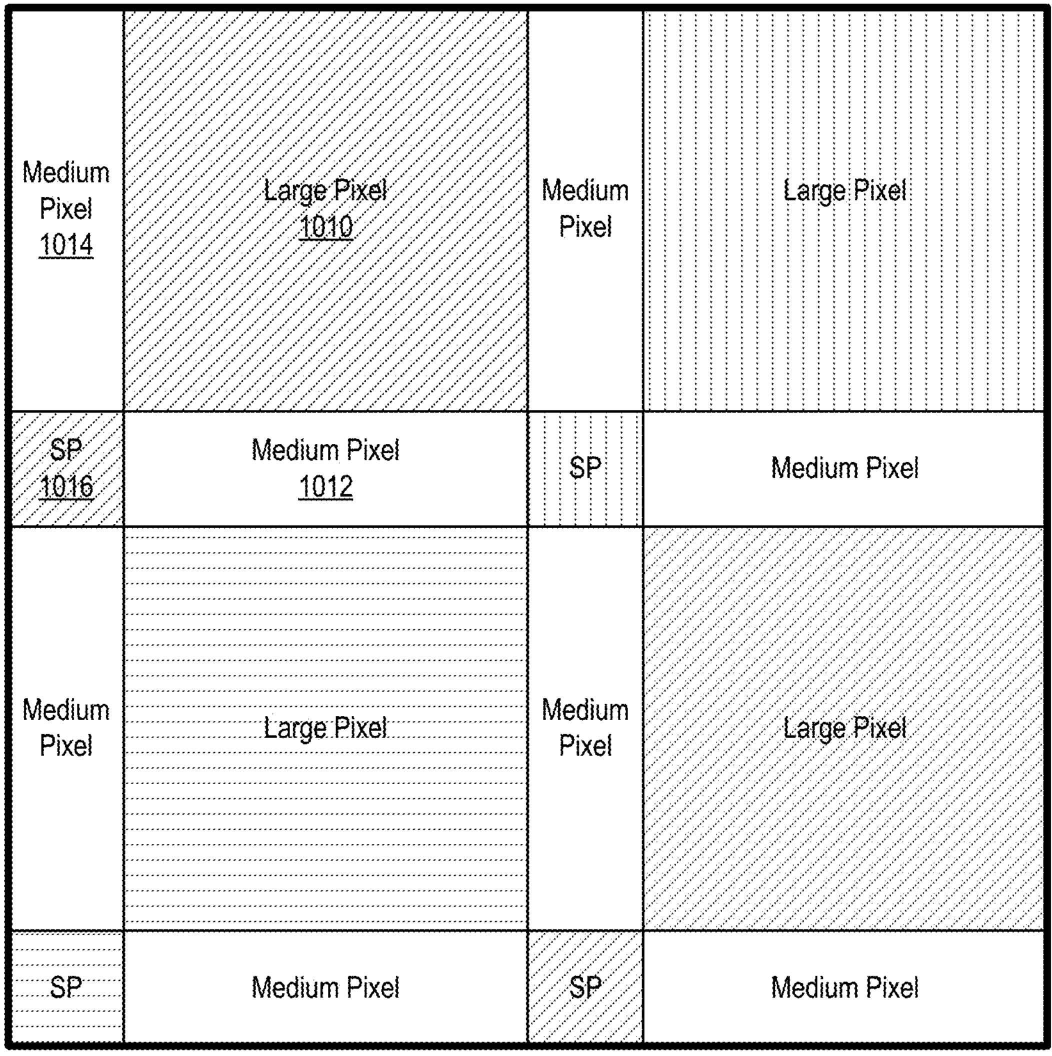
FIG. 10 illustrates another example CFA placement for color image sensors that implement pixel-wise gain selection, according to some embodiments.

FIG. 10 illustrates another example CFA placement for color image sensors that implement pixel-wise gain selection, according to some embodiments As shown in this example, the 2×2 pixel units employ pixels of different sizes, including a large pixel 1010, two medium pixels 1012 and 1014, and a small pixel 1016. Depending on their size, the pixels may output different levels of pixel signal and different signal-to-noise ratios based on the illumination level. In this example, some pixels in the 2×2 pixel unit (the medium pixels 1012 and 1014) are not filtered with any color, while other pixels (the large pixel 1010 and small pixel 1015) are. As shown, the top left and bottom right pixel units are filtered in this way using the green color, the top right pixel unit is filtered this way using the blue color, and the bottom left pixel unit is filtered this way using the red color. Thus, even when the CFA filters pixels in a pixel unit differently, in some embodiments, it is still preferred that only one filtering color is used for the entire pixel unit.

Figure 11:
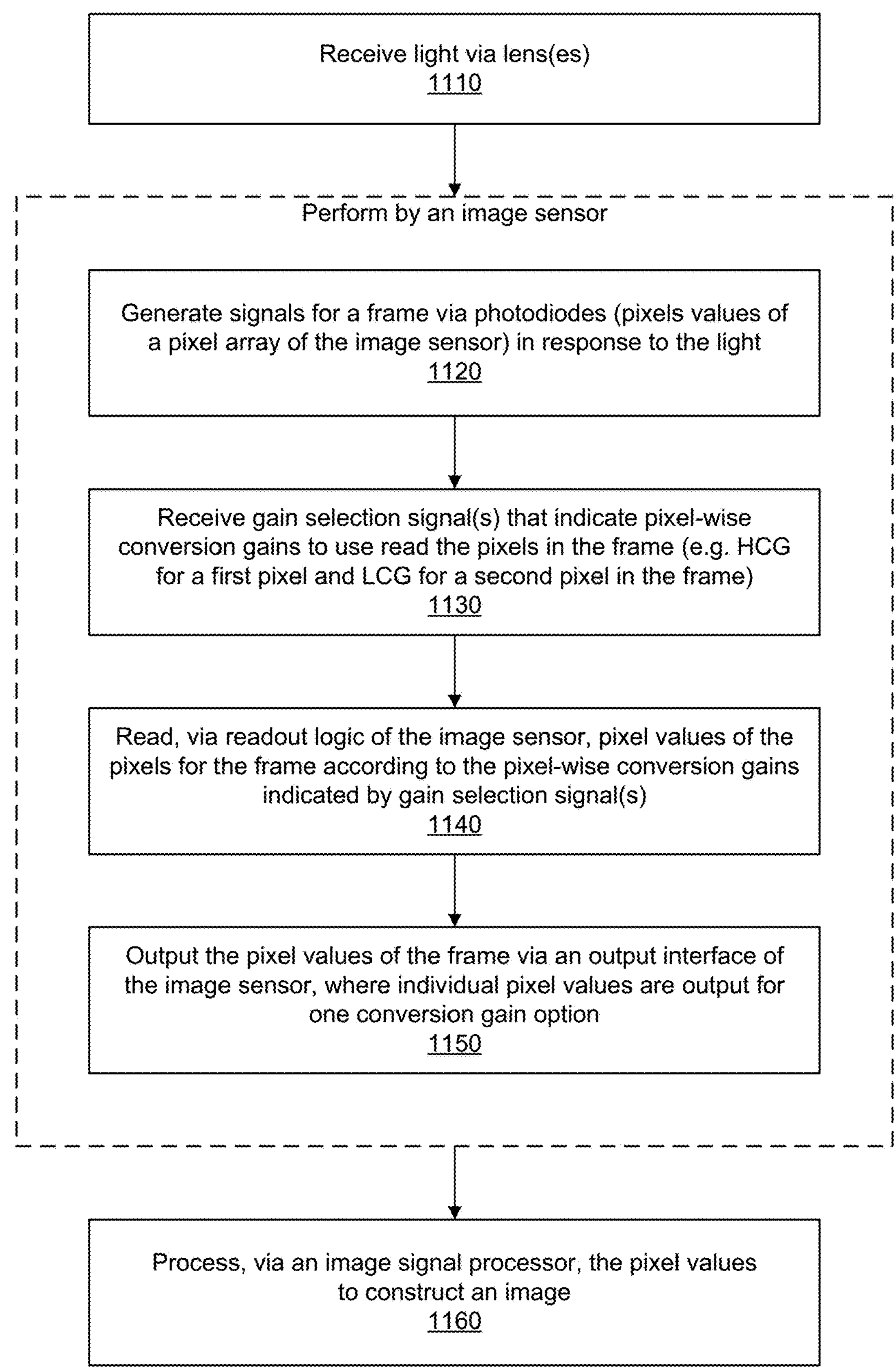
FIG. 11 is a flowchart that illustrates a process performed by an image sensor that performs pixel-wise conversion gain selection, according to some embodiments.

FIG. 11 is a flowchart that illustrates a process performed by an image sensor that performs pixel-wise conversion gain selection, according to some embodiments.

The process begins at operation 1110, where light is received via one or more lenses. The lenses may be implemented as a camera device (e.g. the camera lens 110 of FIG. 1).

As shown, operations 1120 to 1150 are performed by an image sensor, which may be the image sensor integrated circuit 120 of FIG. 1. At operation 1120, signals are generated via photodiodes of the image sensor, for a particular frame. The photodiodes may be used to implement a pixel array of individual pixels, as shown in FIG. 1, and be configured to generate electrical signals in response to the observed light.

At operation 1130, the image sensor receives gain selection signals that indicate pixel-wise conversion gains to use to read individual ones of the pixels in the frame. The conversion rates may be different for the individual pixels, for example, a high conversion gain for a first pixel in the frame and a low conversion gain for a second pixel in the frame. In some embodiments, the image sensor may permit pixels to be read with more than two conversion gain (e.g. three or more conversion gains). In some embodiments, the gain selection signals may specify a pixel gain configuration pattern for a pixel group, such as a pixel unit or kernel that shares readout circuitry or a local region of the pixel array. Example pixel gain configuration pattern are shown in FIG. 2. As discussed, depending on the embodiment, the gain selection signals may be generated within the image sensor integrated circuit or by another component (e.g. the image signal processor and/or an auto-exposure control component). Depending on the embodiment, the image sensor integrated circuit may be implemented on the same die as the image signal processor or a different die used to implement the image signal processor. In some embodiments, the gain selection may be based on characteristics of one or more previous images observed by the camera. In other embodiments, the gain selection may be based on other pixels in the same image, for example, certain initial pixels read in the same pixel unit or local region. The gain selection signals may be updated dynamically based on changing light conditions observed by the camera.

At operation 1140, the readout logic (e.g. readout logic 130 of FIG. 1) reads pixel values of the pixels for the frame (e.g. the photodiode-generated signals) according to the pixel-wise conversion gains specified by the gain selection signals.

At operation 1150, the pixel values of the frame are output via an output interface of the image sensor integrated circuit. The output interface is configured to output the pixel values for only one conversion gain option (the conversion gain that was selected for each pixel). As discussed, because individual pixels are output with only one gain, the output rate of the image sensor can be dramatically increased.

At operation 1160 a downstream image signal process (e.g. ISP 150 of FIG. 1) receives and processes the pixel values output by the image sensor. The ISP may process the pixel values to construct the image, for example, in the process discussed in connection with FIG. 8. As discussed, in some embodiments, the ISP may perform an interpolation process to estimate missing pixels in different frames of the image output for different gain options. The frames are used to reconstruct full resolution images for the different gain options, and then combined or merged to create the final high dynamic range image.

Figure 12:
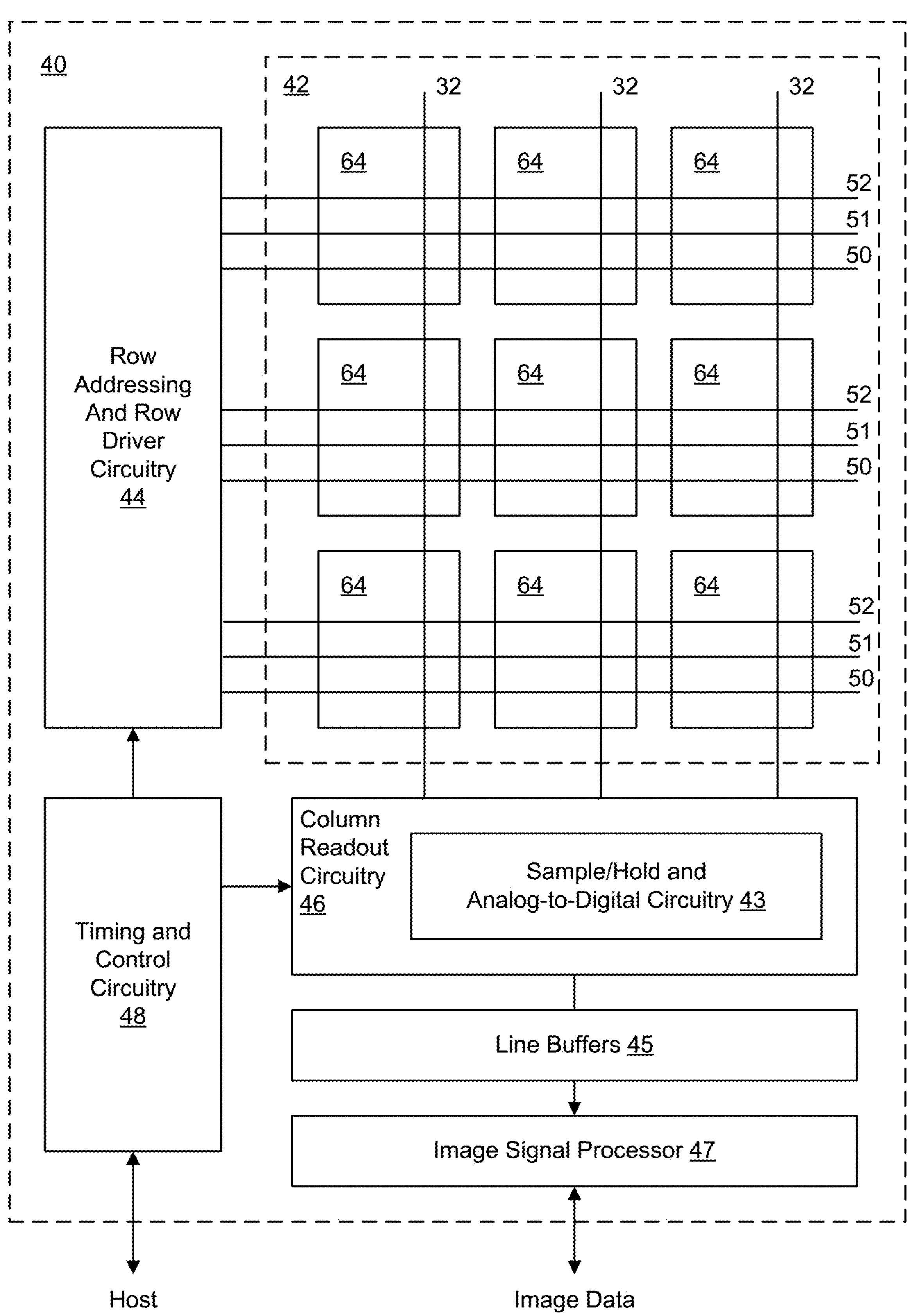
FIG. 12 is a block diagram of an illustrative CMOS image sensor architecture that may be used to implement various embodiments in accordance with the present disclosure.

FIG. 12 is a block diagram of an illustrative CMOS image sensor architecture that may be used to implement various embodiments in accordance with the present disclosure, for example, the image sensor 120 of FIG. 1.

As shown, pixel array 42 includes a large number of pixels arranged in an M×N array. However, CMOS image sensor 40 is shown as including a simplified pixel array 42 comprising a three by three array of pixels 64, which, for ease of discussion, is a pixel circuit in accordance with any of the foregoing embodiments, but may be any of a variety of pixel circuit types that are configured to implement the readout embodiments of the present disclosure. And, for example, in some embodiments, the pixels may be shared pixels (e.g., sharing a FD and RD and possibly additional readout circuitry) and may further be configured for in pixel binning.

Row Addressing and Row Driver Circuitry 44 generates transfer gate (TG) control signals on lines 51, row select (RS) signals on lines 55, and reset drain (RD) control signals on lines 52. In some embodiments, Column Readout Circuitry 46 may be configured to implement the pixel-wise gain selection described herein, and may include analog-to-digital circuitry 43 for sampling and/or digitizing output values readout from the pixel array 42. Circuitry 43 may be implemented to comprise a plurality of A/D converters configured to implement column parallel readout. In some embodiments, the circuitry 43 may be configured such that the readout circuitry associated with each column bus 32 may have a respective analog to digital converter (ADC), though in some embodiments pairs of columns may share an ADC.

Timing and control circuitry 48 controls both the row addressing and row driver circuitry 44 and the column readout circuitry 43. For instance, timing and control circuitry controls the row addressing and row driver circuitry 44 for selecting the appropriate row for readout, and may, for example, provide timing control signals in accordance with rolling shutter readout or global shutter readout. As shown, timing and control circuitry 48 may also communicate or interface with a host (e.g., a processor associated with a camera system comprising the image sensor), which may, for example, in some implementations, specify various control information.

As shown, signals on column buses 32 are sampled and digitized by circuitry 43, and the digitized pixel values provided by the ADCs may be provided to line buffers 45, which may be used to temporarily store digital signals from circuitry 43 for use by image processor 47. In general, any number of line buffers 45 may be included and, for example, each line buffer may be capable of storing digital signals representative of the charge signals that may be read from each pixel in a given row of pixels in the pixel array 42. Image processor 47 may be used to process the digital signals held in line buffers 36 to produce output image data that may be provided to a device external to the image sensor 40.

Although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. Similarly, the structure and/or function of a component may be combined into a single component or divided among two or more components. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with claims that are based on the present disclosure, as such claims may be presented herein and/or in any patent applications claiming priority to, based on, and/or corresponding to the present disclosure.

What is claimed is:

1. An image sensor integrated circuit, comprising:

a plurality of photodiodes that implement pixels in a pixel array, configured to capture a frame; and readout logic for a group of pixels configured to:

receive a gain selection signal indicating respective conversion gains for reading pixel values of the frame from individual ones of the pixels, including a high conversion gain (HCG) and a low conversion gain (LCG);

read at least one first pixel value of the frame from one or more pixels in the group of pixels with the HCG as indicated by the gain selection signal;

read, after the read of the at least one first pixel value, pixel values of the frame from remaining pixels in the group of pixels with LCG as indicated by the gain selection signal in response to determining that the at least one first pixel value satisfies a threshold;

read, after the read of the at least one first pixel value, pixel values of the frame from the remaining pixels in the group of pixels with HCG as indicated by the gain selection signal in response to determining that the at least one first pixel value fails to satisfy the threshold; and output the pixel values of the frame via an output interface of the image sensor integrated circuit.

2. The image sensor integrated circuit of claim 1, wherein the gain selection signal is received from another circuit distinct from the image sensor integrated circuit.

3. The image sensor integrated circuit of claim 1, wherein the threshold is based on a saturation limit for the one or more pixels in the group of pixels.

4. The image sensor integrated circuit of claim 3, wherein the at least one first pixel value satisfies the threshold when a specified number of the one or more pixels have a pixel value that exceeds the saturation limit.

5. The image sensor integrated circuit of claim 3, wherein the at least one first pixel value satisfies the threshold when an average saturation limit for the one or more pixels exceeds the saturation limit.

6. The image sensor integrated circuit of claim 1, wherein the group of pixels are positioned in a local region of the pixel array.

7. The image sensor integrated circuit of claim 6, wherein the pixel array includes a second group of pixels positioned in the local region of the pixel array, and wherein second readout logic for the second group of pixels is configured to:

read pixel values of the frame from pixels in the second group of pixels with LCG as indicated by the gain selection signal in response to determining that the at least one first pixel value satisfies the threshold;

read pixel values of the frame from the pixels in the second group of pixels with HCG as indicated by the gain selection signal in response to determining that the at least one first pixel value fails to satisfy the threshold; and output the pixel values of the frame via the output interface of the image sensor integrated circuit.

8. The image sensor integrated circuit of claim 7, further comprising a regional gain control circuit coupled to the group of pixels and the second group of pixels in the local region of the pixel array, wherein the regional gain control circuit is configured to:

determine the gain selection signal based on the read of the at least one first pixel value of the frame from the one or more pixels in the group of pixels; and provide the gain selection signal to the readout logic and the second readout logic for reading pixel values of the frame from the remaining pixels in the group of pixels and the pixels in the second group of pixels.

9. The image sensor integrated circuit of claim 8, wherein the regional gain control circuit is implemented on an application-specific integrated circuit (ASIC) layer coupled to a pixel layer that implements the pixel array.

10. The image sensor integrated circuit of claim 6, further comprising a color filter array (CFA) configured to filter light received by the pixels for different colors in the pixel array, wherein the CFA uses one color for pixels in the local region of the pixel array.

11. A camera, comprising:

one or more lenses configured to receive light;

an image sensor comprising:

a plurality of photodiodes that implement pixels in a pixel array, configured to capture a frame according to the light;

a regional gain control circuit asserting a gain selection signal indicating respective conversion gains for reading pixel values of the frame from individual ones of the pixels in a local region of the pixel array, including a high conversion gain (HCG) and a low conversion gain (LCG);

readout logic for a group of pixels configured to:

receive the gain selection signal from the regional gain control circuit indicating the respective conversion gains for reading the pixel values of the frame from the individual ones of the pixels in the group of pixels;

wherein the regional gain control circuit is configured to:

read at least one first pixel value of the frame from one or more pixels in the local region of the pixel array with the HCG as indicated by the asserted gain selection signal;

assert, after the read of the at least one first pixel value, LCG for the gain selection signal for readout of pixel values of the frame from remaining pixels in the local region of the pixel array in response to determining that the at least one first pixel value satisfies a threshold;

assert, after the read of the at least one first pixel value, HCG for the gain selection signal for readout of pixel values of the frame from the remaining pixels in the local region of the pixel array in response to determining that the at least one first pixel value fails to satisfy the threshold; and output the pixel values of the frame via an output interface of the image sensor.

12. The camera of claim 11, wherein the regional gain control circuit is implemented on an application-specific integrated circuit (ASIC) layer coupled to a pixel layer that implements the pixel array.

13. The camera of claim 11, wherein the threshold is based on a saturation limit for the one or more pixels in the group of pixels.

14. The camera of claim 11, wherein the regional gain control circuit is configured to assert the gain selection signal to an additional group of pixels in the local region of the pixel array after the read of the at least one first pixel value.

15. The camera of claim 11, further comprising an additional regional gain control circuit asserting an additional gain selection signal indicating respective conversion gains for reading pixel values of the frame from individual ones of the pixels in an additional local region of the pixel array, including the high conversion gain (HCG) and the low conversion gain (LCG), wherein the additional regional gain control circuit asserts its additional gain selection signal independent of the regional gain control circuit's assertion of its gain selection signal.

16. The camera of claim 15, further comprising:

at least one additional readout logic for at least one additional group of pixels configured to:

receive the additional gain selection signal from the additional regional gain control circuit indicating the respective conversion gains for reading the pixel values of the frame from the individual ones of the pixels in the at least one additional group of pixels.

17. The camera of claim 11, further comprising a color filter array (CFA) configured to filter light received by the pixels for different colors in the pixel array, wherein the CFA uses one color for pixels in the local region of the pixel array.

18. A camera, comprising:

one or more lenses configured to receive light;

an image sensor comprising:

a plurality of photodiodes that implement pixels in a pixel array, configured to capture a frame according to the light;

a regional gain control circuit asserting a gain selection signal indicating respective conversion gains for reading pixel values of the frame from individual ones of the pixels in a local region of the pixel array, including a high conversion gain (HCG) and a low conversion gain (LCG);

readout logic for a group of pixels configured to:

receive the gain selection signal from the regional gain control circuit indicating the respective conversion gains for reading the pixel values of the frame from the individual ones of the pixels in the group of pixels;

wherein the regional gain control circuit is configured to:

read at least one first pixel value of the frame from one or more pixels in the local region of the pixel array with the HCG as indicated by the asserted gain selection signal;

assert, after the read of the at least one first pixel value, LCG or HCG for the gain selection signal for readout of individual pixel values of the frame from remaining pixels in the group of pixels according to a pixel gain configuration pattern, the pixel gain configuration pattern being determined based on the at least one first pixel value; and output the pixel values of the frame via an output interface of the image sensor.

19. The camera of claim 18, wherein the group of pixels includes a 2×2 group of four pixels, and wherein the pixel gain configuration pattern is one of:

a high gain only pattern that asserts HCG for all four pixels;

a low-light focused pattern that asserts HCG for three of the four pixels;

a balanced pattern that asserts HCG for two of the four pixels;

a high-light focused pattern that asserts HCG for one of the four pixels; and a low-gain only pattern that asserts LCG for all four pixels.

20. The camera of claim 18, wherein the regional gain control circuit is configured to assert the pixel gain configuration pattern to multiple groups of pixels in the local region of the pixel array.

* * * * *